March 23, 1937. C. DE L. RICE 2,074,489
SPRING SUSPENSION
Filed May 14, 1934 3 Sheets-Sheet 1

Charles DeLos Rice, Inventor

By
Attorney

March 23, 1937.  C. DE L. RICE  2,074,489
SPRING SUSPENSION
Filed May 14, 1934  3 Sheets-Sheet 2

Inventor
Charles DeLos Rice
By C. Clay Lindsey
Attorney

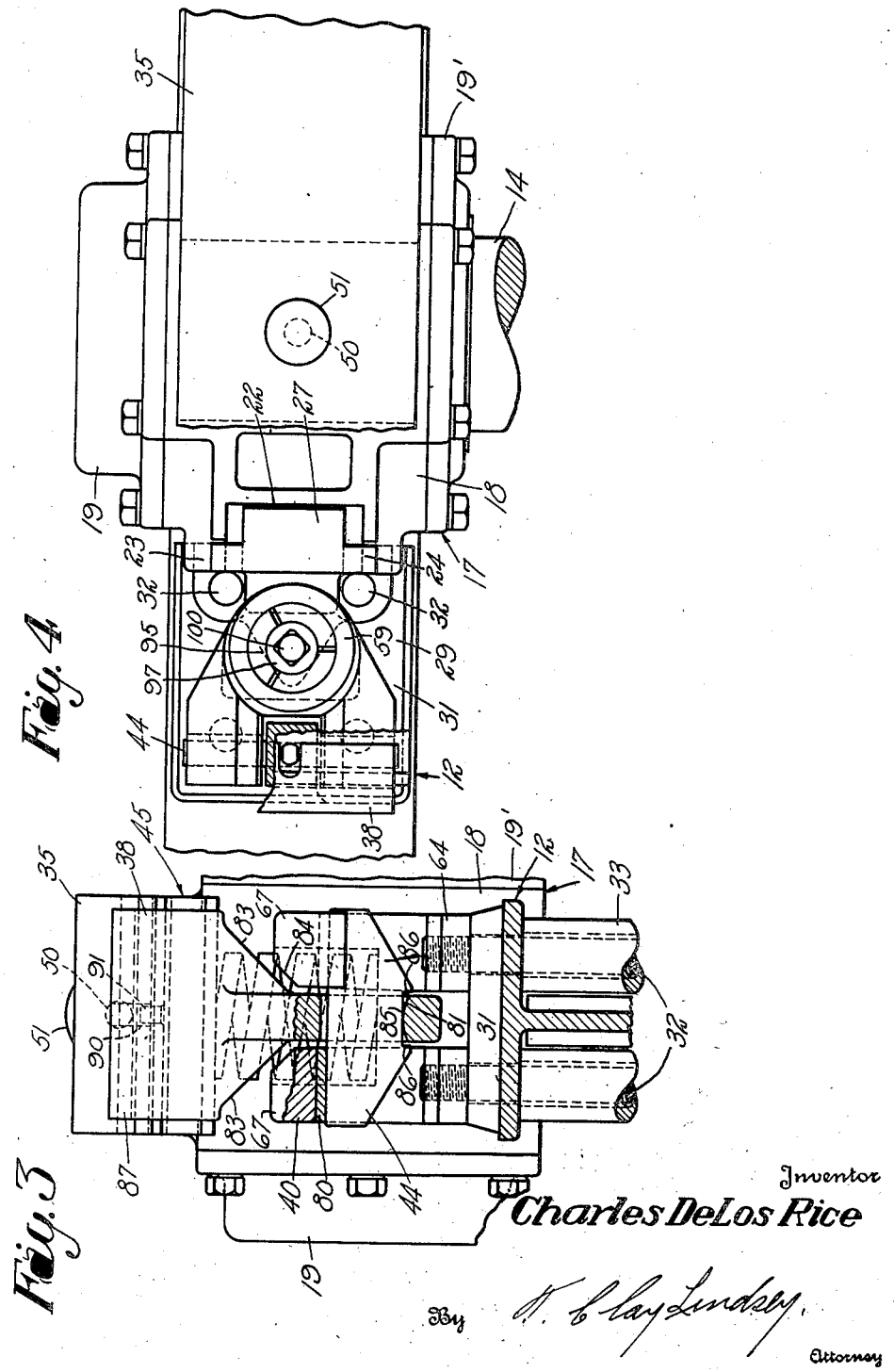

Patented Mar. 23, 1937

2,074,489

UNITED STATES PATENT OFFICE 2,074,489

SPRING SUSPENSION

Charles De Los Rice, West Hartford, Conn.

Application May 14, 1934, Serial No. 725,434

10 Claims. (Cl. 105—222)

This invention relates to improvements in spring suspensions, and particularly to improvements in spring suspensions for railway cars, and has for an object the provision of an improved spring suspension for resiliently supporting the truck frame of a railway car upon the wheeled axles to provide for resiliently resisted vertical and sidewise movement of the truck frame with respect to the axles.

A further object lies in the provision in a spring suspension of the character described of springs for supporting the truck frame upon journal boxes mounted on the axle ends and articulated means for connecting the springs to the truck frame in such manner that the latter may have a limited and easy floating movement in a sidewise direction.

A still further object resides in the provision of simplified means for mounting the springs and securing the bolster members of the truck platform to the springs.

Other objects and advantages will appear as the description proceeds.

In the accompanying drawings, in which like reference numerals refer to similar parts throughout, I have illustrated a suitable mechanical embodiment of the idea of my invention. The drawings, however, are to be taken for the purpose of illustration only and not as limiting the invention, the scope of which is to be measured entirely by the scope of the appended claims.

In the drawings:

Fig. 3 is a sectional view on the line 3—3 of Fig. 1; and

Fig. 4 is a plan view of the improved spring suspension, portions thereof being broken away to better illustrate the construction thereof.

Figure 1:
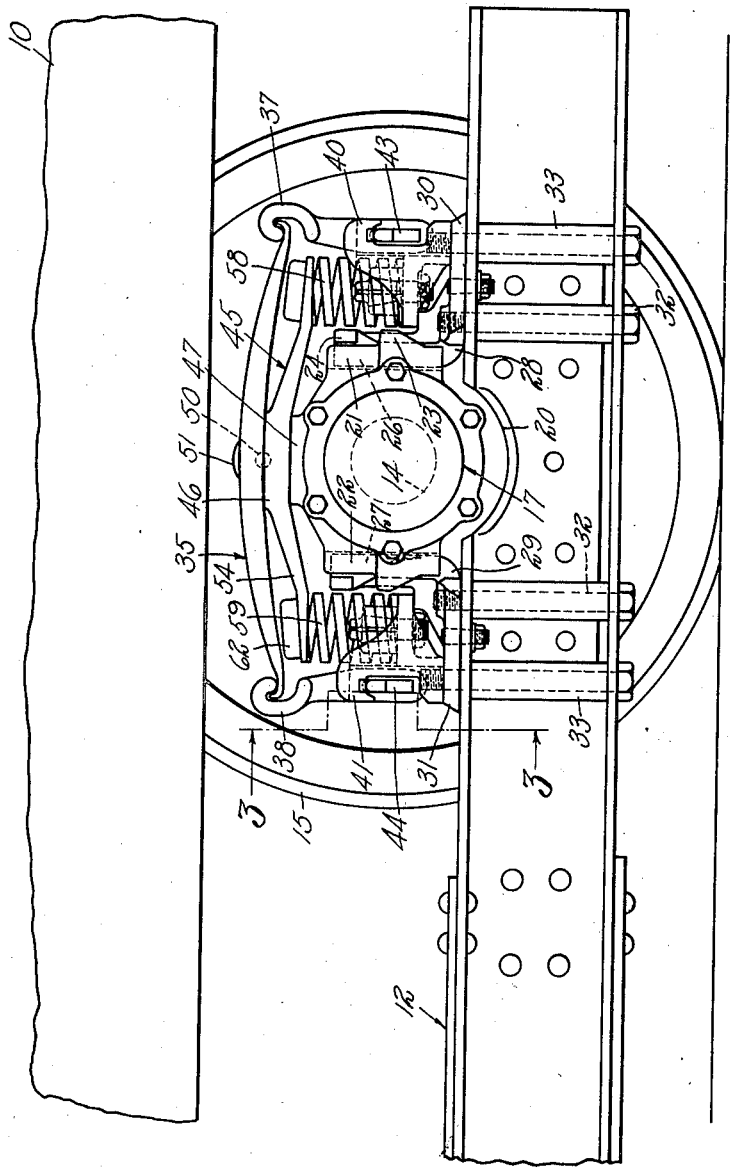
Fig. 1 is an elevational view of fragmentary portions of a car body and supporting truck showing my improved spring suspension applied thereto.

In the accompanying drawings, the numeral 10 generally indicates the body of a railway car, and the numeral 12 generally indicates one of the underslung H-section side bolster members of the truck upon which the car body is supported at one end. The numeral 14 indicates one of the axles carried by a pair of rail wheels one of which is indicated at 15. The ends of each axle project beyond the rail wheels and a journal box, preferably carrying an antifriction bearing, is mounted upon each projecting axle end. One such journal box is generally indicated at 17, and comprises a body portion 18 within which the journal bearings are mounted and within which the corresponding axle end is rotatably received, a cover plate 19 closing the outer face of the journal box, and an apertured cover plate 19' closing the space between the body portion and the axle at the inner face of the journal box. The bolster 12 extends below this journal box and is provided in the portion thereof immediately below the journal box with a reinforced depression 20 to provide clearance between the upper surface of the bolster member and the under surface of the journal box. The body portion 18 of the journal box is provided along its opposite sides with vertically extending guideways or grooves 21 and 22 in which upwardly extending legs 26 and 27 of guide brackets 28 and 29 are slidably received. The legs 26 and 27 of the guide brackets are each provided with stops or extensions, as indicated at 24, which overhang extensions 23 on the journal box in order to prevent the truck frame from falling down and causing disaster in the event a spring 35 should break. The guideways 21 and 22 are considerably wider than the portions of the legs 26 and 27 of the guide brackets fitting therein (as clearly indicated in Fig. 4) so as to provide liberal side clearance between the journal boxes and the guide brackets and thus allow for appreciable transverse movement between the truck frame and journal boxes. The guides 26 and 27 are spaced apart from one another so as to receive the journal box closely between them and thus prevent appreciable lengthwise movement of the truck frame with respect to the journal box, there being only sufficient room for oil between the guides and the bottom surfaces of the guideways. The guide brackets 28 and 29 are also provided, respectively, with horizontally extending bases 30 and 31 which are mounted upon the upper surface of the bolster member 12 at opposite sides of the depression 20 and are secured to the bolster member by means of bolts, as indicated at 32. The guide brackets may be accurately positioned in place by means of tapered dowels 32'. Between the upper and lower flanges of the H-section bolster member, the bolts 32 extend through tubular spacers 33 which bear at their ends against the inner surfaces of the upper and lower flanges of the bolster member to reinforce the construction. A pair of bolts 32 is preferably positioned upon each side of the web of the bolster member in association with each of the brackets 28 and 29 so that each guide bracket is secured to the bolster member by four such bolts.

Referring now to the means for suspending the truck frame from tne journal boxes, the same, in accordance with the present invention, is so constructed and arranged that the truck frame may have the usual vertical movement with respect to the axles, and also the truck frame may float or oscillate transversely. The spring suspension associated with each journal box consists generally of a spring 35 supported by the journal box; links 37 and 38 fulcrumed on and depending from the opposite ends of the spring; rocker members 43 and 44 associated with the lower ends of the links in such manner that the links may rock or oscillate transversely to permit of sidewise movement of the truck frame, and hook brackets 40 and 41 secured to the bolster 12 and so associated with the rocker members that each of the latter may roll thereon.

Figure 2:
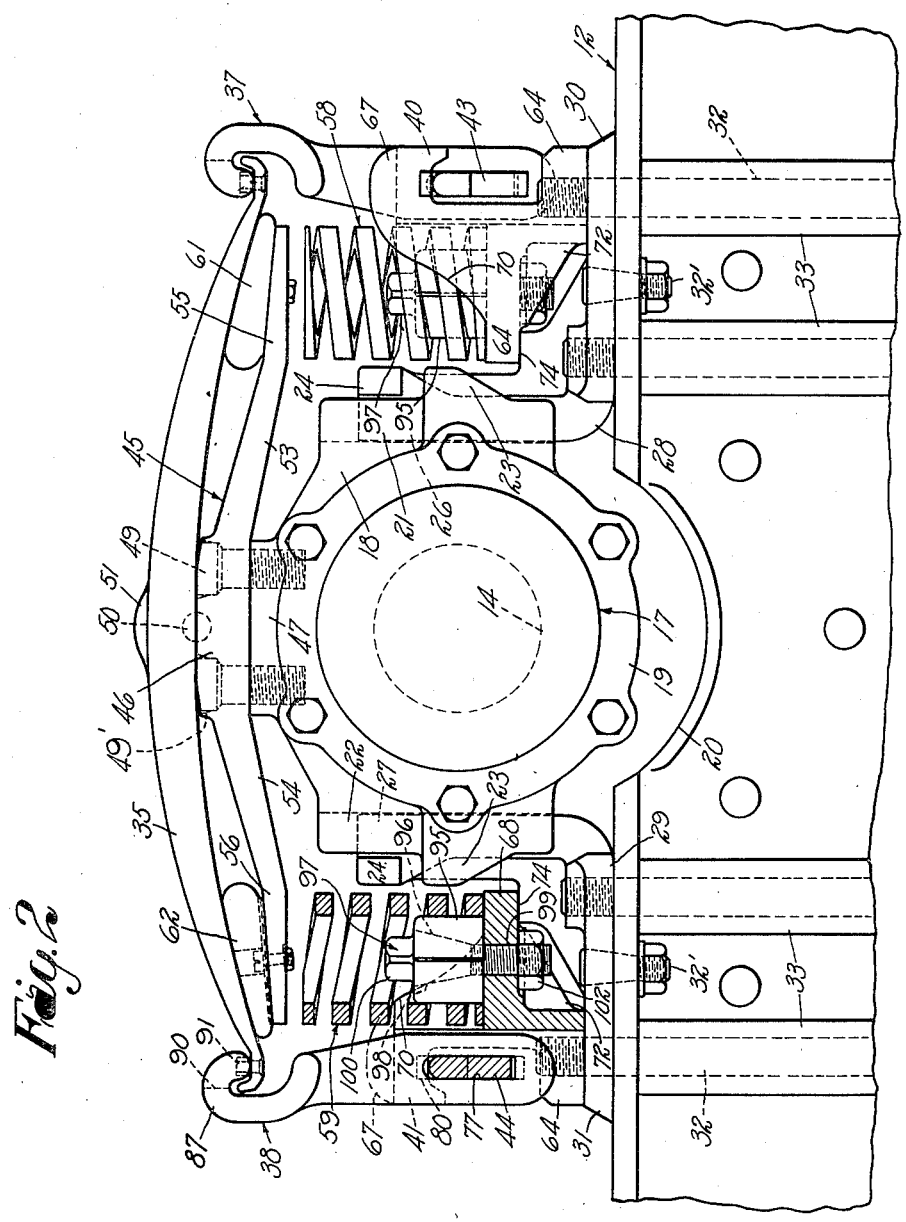
Fig. 2 is an elevational view of the spring suspension showing the main spring in its position of substantially maximum flexure due to road shock, a portion of the structure being shown in section to better illustrate the construction thereof.

The spring 35 consists of a single, relatively wide piece of tempered steel tapered down in thickness towards its ends and provided at each end with an upturned transverse hook portion. Each of the links 37 and 38 has a hooked portion 87 at its upper end engaging over the respective hook on the end of the spring. In order to hold the hooked portion of the link against transverse movement with respect to the end of the spring, the hook 87 has a centrally located recess or notch 90 into which a stud 91, secured to the end of the spring, projects. The lower end of each link is relatively flat and has an elongated vertical slot 77. The link may be provided with reinforcing webs 83. The rocker members 43 and 44 are in the form of vertically disposed plates having their upper edges rounded or curved, as shown most clearly in Fig. 2. These plates extend through the slots 77. Preferably, the lower edge of the plate is notched, as at 85, so as to provide shoulders 86 at opposite sides of the link at the lower end of the elongated slot. The lower edge of the slot is transversely curved, as at 81, and this curved surface engages the lower edge of the plate, in the present instance between the shoulders 86. Each of the hook brackets is provided with a pair of feet 64 and a hook comprising two hooked portions 67 transversely spaced apart so as to accommodate between them the stem of a respective link. The feet 64 are provided with screw threaded apertures to receive the upper ends of two of the bolts 32 whereby the hook brackets are rigidly secured upon the base of the respective guide bracket. Each hook bracket is also provided with a shelf 68 for a purpose to be later described, and suitable reinforcing webs 70 and 72. Shelves 68 may rest on ledges or seats 74 provided on the guide brackets. Each hooked portion 67 is provided in its under surface with a hardened bearing strip 80, and the rounded upper edges of the rocker members bear against the lower surfaces of these bearing strips. The upper inner corners of the hooked portions are chamfered or cut away, as at 84, so as to provide for limited freedom of movement between the links and the bearing bracket.

My improved spring suspension is also provided with means for dampening the recoil of the spring 35 and for reinforcing this spring when it is subjected to excessive loads. For the purpose of dampening the recoil of the spring and supporting it under excessive load, I have provided, between the spring 35 and the top of the journal box 17, a member, generally indicated at 45. This member has a somewhat enlarged intermediate portion 46 provided with flat, parallel upper and lower surfaces, the lower surface being positioned on the flat horizontal surface of a table 47 provided upon the upper part of the body portion 18 of the journal box, and the upper surface being slightly rounded off at its ends and forming a support for the central portion of the spring 35. The member 45 is secured to the journal box 17 by means of screws 49 which extend through the intermediate portion 46 of the member 45 and are screw threaded into the table portion 47 of the journal box. The head of each of these screws is finished off flush with the upper surface of the intermediate portion of the member 45, and then the top edge of the head is peened into pockets 49' provided preferably at two points opposite each other in the recess receiving the same. The spring 35 is retained in position upon the member 45 by means of a ball 50 which projects into complementary indentations formed in the upper surface of the member 45 and the lower surface of the spring 35. The metal displaced to form the depression in the spring is bulged out at the upper surface of the spring to form a dome 51 which increases the depth of the spring at the central cross section thereof and materially adds to the strength of the spring at this point.

The member 45 is formed of strong resilient material, such as tempered spring steel, and is provided at each side of the intermediate portion 46 thereof with tapered arms 53 and 54 which extend beneath and parallel to the spring 35 to locations adjacent to the opposite ends of the spring. The end portions 55 and 56 of these arms overlie the tops of coiled compression springs 58 and 59 respectively, the lower ends of these springs being mounted upon the shelves 68 formed on the respective hook brackets 40 and 41. The upper surfaces of the end portions 55 and 56 of the member 45 carry resilient pads 61 and 62 made of rubber or some suitable resilient material. With this arrangement, when the ends of the spring 35 are deflected downwardly sufficiently to engage and compress the rubber pads 61 and 62, the coiled springs 58 and 59 carry away from the member 45, and when the spring 35 reacts the coiled springs meet the under surface of the member 45 and act as shock absorbers to the upward movement of the truck frame. The member 45 with the rubber pads also serves to gently arrest the downward movement of the truck frame.

In order to hold the lower end of the recoil springs 58 and 59 in position and against chattering on the shelves 68 of the hook brackets 40 and 41, I have provided, within the lower portion of each of these springs, an expansible bushing comprising a plurality of equal sectors 95, in the present instance three. The bushing is provided with an axial hole 96 which tapers down in diameter towards its lower end. A bolt 97 has a tapered portion 98 fitting within the tapered aperture 96 and also a screw threaded portion or stem 99 which is screwed through a threaded aperture in the shelf 68. The bolt is provided at its upper end with a squared head 100 by means of which the bolt may be screwed into the latter aperture. Upon the lower end of the bolt is a nut 102 to retain the bolt in adjusted position and against accidental loosening. With this arrangement, it will be seen that, by turning the bolt, the diameter of the bushing may be adjusted so that the periphery of the bushing will engage the inner periphery of the spring. By preference, the adjustment is such that, in normal condition of the spring, it will slightly hug the bushing so that the spring will not chatter when the coiled springs are away from the member 45. After the parts are adjusted, the nut 102 may be screwed home.

From the foregoing description, taken in connection with the accompanying drawings, it will be observed that the lower end of each link 37 and 38 is so associated with a hook bracket through a rocker member that these links may rock sidewise or transversely and thus permit of a sidewise or transverse oscillating or rocking motion of the truck frame which is desirable, particularly where the track is curved. Upon a sidewise rocking motion of the frame, there is a slight twisting action in the spring 35 and this action, in itself, offers a cushioning effect which prevents colliding of the guides 26 and 27 against the side surfaces of the guideways in the journal box.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a spring suspension for supporting a truck frame upon the wheeled axle of the truck of a railway car, a journal box on said axle, a relatively wide spring supported at its central portion upon said journal box and having upturned ends, brackets fixed to said frame below the respective ends of said spring and each having a hook portion, a link between each end of said spring and the respective bracket, each link having a downturned upper end fulcrumed on a line extending transversely of the associated end of said spring whereby the link may pivot on the spring longitudinally of the spring and the end of the spring is twisted when the lower end of the link associated therewith moves transversely, said twisting movement of the spring tending to resist and cushion the truck frame against sidesway movement, and means connecting said links to said brackets to permit movement of said truck frame relative to said axle transversely of said frame.

2. In a spring suspension for supporting a truck frame upon the wheeled axle of the truck of a railway car, a journal box on said axle, a relatively wide spring supported at its central portion upon said journal box, brackets fixed to said frame below the respective ends of said spring, a link between each end of said spring and the respective bracket, said links being fulcrumed on the ends of said spring along lines extending transversely thereof whereby the links may pivot in the direction of the length of the spring and the ends of the spring are twisted when the lower ends of the links move sidewise, said twisting movement of the spring ends tending to resist and cushion the truck frame against transverse movement, and a rocker member connecting the lower end of each link to the respective bracket, said rocking members being fulcrumed on said brackets, and said links being associated with said rocker members to permit of sidewise or transverse swinging motion of said truck frame.

3. In a spring suspension for supporting a truck frame upon the wheeled axle of the truck of a railway car, a journal box on said axle, a spring centrally supported upon said journal box and extending upon each side thereof, and an articulated connection for securing each end of said spring to said frame, each of said connections comprising, a link having a hook portion engaged with the respective end of said spring and an apertured stem portion, a hook bracket secured to said frame having a pair of spaced hook portions for receiving said stem therebetween, and a rocker member extending through said aperture and beneath said hook portions and having a rolling engagement of limited extent with said hook portions, said rocker members having a rolling engagement with the bottoms of said apertures of said links to allow for sidewise movement of said frame.

4. In a spring suspension for supporting a truck frame upon a wheeled axle, a journal box on said axle, a spring mounted thereon, and link connections between said spring and truck frame arranged and constructed to permit said truck frame to move sidewise, said links being associated with said spring whereby when said truck frame moves sidewise the ends of said spring are twisted and cushion the sidewise movement of the truck frame.

5. In a spring suspension for supporting a truck frame upon a wheeled axle, a journal box on said axle, a spring mounted thereon, link connections between said spring and truck frame arranged and constructed to permit said truck frame to move sidewise, said links being associated with said spring whereby when said truck frame moves sidewise the ends of said spring are twisted and cushion the sidewise movement of the truck frame, and recoil springs for resiliently resisting movement of said truck frame upwardly.

6. In a spring suspension for supporting a truck frame upon a wheeled axle, a journal box on said axle, an elongated spring mounted on said journal box, a recoil member below said spring, a recoil spring between each end of said recoil member and said frame, a link fulcrumed on each end of said spring, a hook bracket secured to said truck frame below each end of said spring, and rocking members for connecting said links to said hook brackets to permit sidewise movements of said truck frame.

7. In a spring suspension for supporting a truck frame upon the wheeled axle of the truck of a railway car, the truck frame, a journal box on said axle, a relatively wide spring supported at its central portion upon said journal box, a link fulcrumed upon each end of said spring along a line extending transversely thereof whereby each link may pivot in the direction of the length of the spring and the end of the spring is twisted when the lower end of the link associated therewith moves sidewise, the twisting movement of the ends of said spring serving to resiliently resist the sidesway of the truck frame, means for operatively connecting the lower ends of said links to said truck frame to permit limited movement of said truck frame with respect to said axle transversely of the frame and to permit the links to pivot in the direction of the length of said spring through a limited extent, and means which limits the extent of said transverse movement and prevents longitudinal movement of the frame relative to the axle.

8. In combination, a wheeled axle, a journal box on an end of the axle, a truck frame having a longitudinally extending beam located beneath the journal box and disposed at right angles to said axle, a longitudinal spring supported intermediate of its ends upon the journal box and extending generally in the direction of the length of said beam, brackets secured to said beam and respectively located beneath the opposite ends of said spring, and links respectively connecting each of said brackets with the spring end thereabove, said links being fulcrumed to the spring ends and brackets about axes parallel to said wheeled axle whereby said links may assume a simultaneous rocking motion with respect to said spring and brackets.

9. In combination, a wheeled axle, a journal box upon one end of the axle and arranged to rotatably receive the axle, a truck frame having a beam located beneath the box and extending longitudinally at right angles to the axle, a spring extending generally in the direction of the length of the beam and above said beam, said spring being supported at its central portion upon the journal box and having upturned outer ends, brackets respectively fastened to the beam beneath each end of the spring, each bracket having a downwardly turned hooked portion, and a link between each end of said spring and the respective bracket therebeneath, each link being provided with a downwardly turned upper end fulcrumed on the hooked end of the spring and having means within its lower portion fulcrumed in the hooked portion of its respective bracket.

10. In combination, a wheeled axle, a journal box on the end thereof and having a substantially vertical groove in each side, a truck frame having a beam extending beneath the journal box and at right angles to said axle, guide brackets on said beam arranged in straddling relation to said journal box and respectively slidably engaging within the side grooves thereof, a spring having a central portion supported by said journal box and having its opposite ends extending forwardly and rearwardly, said ends being upturned, hooked brackets secured to said beam below the respective ends of said springs and a link connected between each bracket and the respective end of the spring.

CHARLES DE LOS RICE.